(12) United States Patent
Scheid et al.

(10) Patent No.: US 6,374,702 B1
(45) Date of Patent: Apr. 23, 2002

(54) DRIVE SYSTEM OF AN AGRICULTURAL VEHICLE

(75) Inventors: Heinrich Scheid, Blieskastel; Bernd Rabe, Dellfeld, both of (DE)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/618,846

(22) Filed: Jul. 18, 2000

(30) Foreign Application Priority Data

Jul. 31, 1999 (DE) .......................................... 199 36 264

(51) Int. Cl.[7] .............................................. B60K 41/26
(52) U.S. Cl. .................................... 74/730.1; 74/473.21
(58) Field of Search .............................. 74/655, 730.1, 74/473.21, 473.24, 473.26

(56) References Cited

U.S. PATENT DOCUMENTS

| | | | |
|---|---|---|---|
| 3,135,367 A | * 6/1964 | Gregorich | |
| 3,169,616 A | * 2/1965 | Hunsaker et al. | |
| 3,910,389 A | * 10/1975 | Pleier | 192/219 |
| 4,300,652 A | * 11/1981 | Redzinski et al. | 192/222 |
| 4,349,089 A | * 9/1982 | Finney | |
| 4,572,340 A | 2/1986 | Pierce | 192/4 C |
| 5,383,541 A | 1/1995 | Kaplan | 192/4 C |

FOREIGN PATENT DOCUMENTS

| | | |
|---|---|---|
| DE | 291 380 | 6/1991 |
| EP | 0 819 562 A2 | 1/1998 |

* cited by examiner

Primary Examiner—Sherry Estremsky (57) ABSTRACT

A vehicle includes a variable speed hydrostatic transmission which drives through a gear transmission, having selectable gear ratios, to provide propulsion power to a pair of drive wheels. The hydrostatic transmission is used as a brake to supplement the braking ability of the vehicle. The gear transmission is provided with a positioning plate which is mounted for pivoting between respective positions corresponding to different transmission gear ratios in response to a gear shift lever being moved between corresponding positions. Provided for ensuring that the gear transmission is not shifted to neutral while the vehicle is in motion, and the consequent loss of the ability of the hydrostatic transmission to provide braking, is a blocking arrangement, including a vehicle motion responsive sensor, that operates to prevent the movement of the positioning plate, so long as the vehicle is in motion.

10 Claims, 6 Drawing Sheets

DRIVE SYSTEM OF AN AGRICULTURAL VEHICLE

The invention concerns the drive system of an agricultural vehicle, with a hydraulic motor that drives elements in contact with the ground for the propulsion of the vehicle, in particular wheels and/or crawler chains, with an intervening gearbox, where the hydraulic motor is able to act as a brake upon the elements in contact with the ground.

BACKGROUND OF THE INVENTION

In agricultural vehicles and front harvesting attachments, such as cutter heads and corn pickers, a tendency can be see towards ever more powerful, larger and therefore heavier units. For reasons of safety of operation and of traffic, there s also the necessity to dimension the brakes of the vehicles correspondingly. In order to avoid having to increase the size and thereby the cost of the conventional friction brakes, that are, as a rule, disk or drum brakes, and act mechanically on the axles of the wheels, there is also the possibility of utilizing the braking effect of a hydrostatic drive of the vehicle, whose swash plate is brought into the null position.

In a publication (VkB1. official part, volume 21–1998, dated Oct. 5, 1998, page 1226 and following) guidelines are forth for brake systems of vehicles with hydrostatic drives in which it has been established that such vehicles are admitted to traffic over roads only if this drive cannot be uncoupled during the operation and operates as a hydrostatic brake system or is a component of at least one brake system. It is not disclosed how the uncoupling can be prevented.

EP 0819562 A describes a gearbox shifting system for a harvesting machine in which the user can push a button associated with the desired gear ratio. If the button is pushed, a mechanical brake, independent of the gearbox, is applied automatically by a control arrangement, which brings the harvesting machine to a stop. If the harvesting machine is stopped, which can be determined on the basis of the expiration of a pre-determined time interval that is required in the general case for the braking of the harvesting machine, or by means of a speed sensor, then the shifting process is performed. The reason for this is the fact that the hydrostatic gearbox of the harvesting machine can only be shifted when the machine is stopped. The disadvantage is the high cost.

U.S. Pat. No. 4,572,340 describes a blocking arrangement for an automatic transmission, which permits a shift between a neutral, forward and reverse position of the selector lever of the automatic transmission only if the service brakes of the vehicle are applied. The blocking arrangement locks the selector lever for such a time until the brakes are applied.

The problem underlying the invention is seen as that of creating an agricultural vehicle with a hydrostatic traction drive that is safe in traffic and low in cost.

SUMMARY OF THE INVENTION

According to the present invention there is provided an improved drive system for the ground-engaging propulsion elements of an agricultural vehicle wherein the drive system embodies a hydrostatic transmission coupled to a gear transmission.

An object of the invention is to provide a mixed hydrostatic and gear transmission that uses the hydrostatic transmission for braking the ground wheels with a simple inexpensive way of controlling the drive system so that gear ratio changes in the gear transmission cannot be done unless the vehicle is at a standstill.

A more specific object of the invention is to provide a drive system as set forth in the previous object wherein the shifting assembly for the gear transmission includes a device which blocks the shifting operation if the propulsion wheels are rotating.

Yet a more specific object is to provide a drive system as set forth in the immediately preceding object wherein the device which blocks the shifting operation includes a controller which is responsive to the pressure developed by a lubrication pump for completing a circuit for energizing a solenoid that positions a locking pin in a lock position any time the propulsion wheels are being driven by the hydrostatic transmission or when they are coasting.

These and other objects of the invention will become apparent from a reading of the ensuing description together with the appended drawings.

DESCRIPTION OF THE PREFERRED EMBODIMENT

Figure 1:
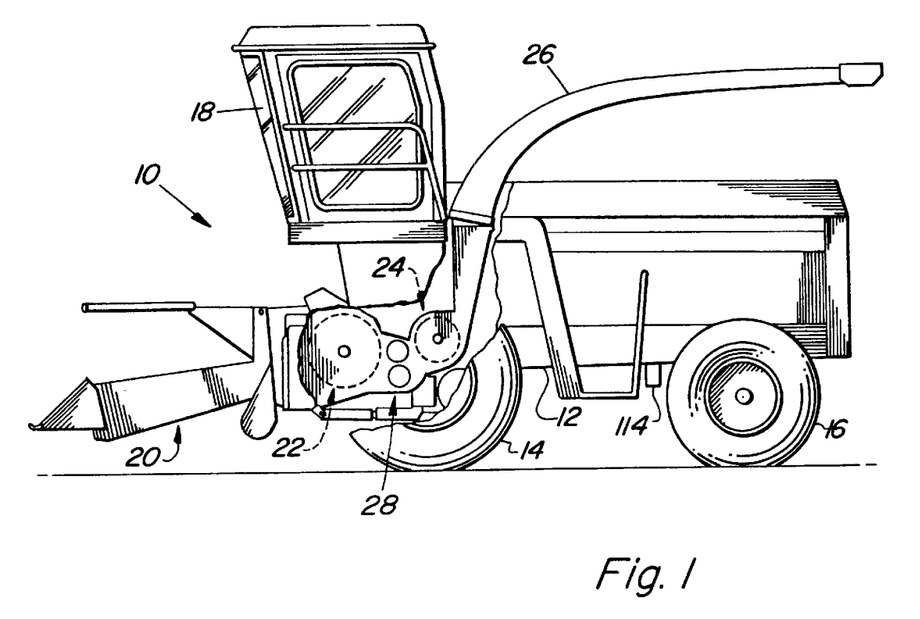
FIG. 1 is a schematic side view of a harvesting machine.

Referring now to FIG. 1, there is shown a harvesting machine 10, which is in the form of a self-propelled forage harvester including a frame 12 that is supported on a front pair of driven ground wheels 14 and a rear pair of steerable wheels 16. The operation of the harvesting machine 10 is controlled from an operator's cab 18 from which a crop intake arrangement 20 can be easily seen. Crop taken up from the ground by the crop intake arrangement 20, for example, corn, grass or the like is conducted to a chopper drum 22 that chops it into small pieces and conducts it to a conveyor arrangement 24. The crop leaves the harvesting machine 10 to an accompanying trailer through a discharge duct 26 that is mounted for swinging horizontally. Between the chopper drum 22 and the conveyor arrangement 24 there extends a post-chopper reduction arrangement 28, through which the conveyed crop is conducted tangentially to the conveyor arrangement 24. Further details of the harvesting machine 10 do not need description since this is known in itself. the harvesting machine 10 is shown here only as an example in the form of a forage harvester; the invention can also be applied to any desired self-propelled agricultural vehicles, such as combines, tractors, telescoping loaders and the like.

Figure 2:
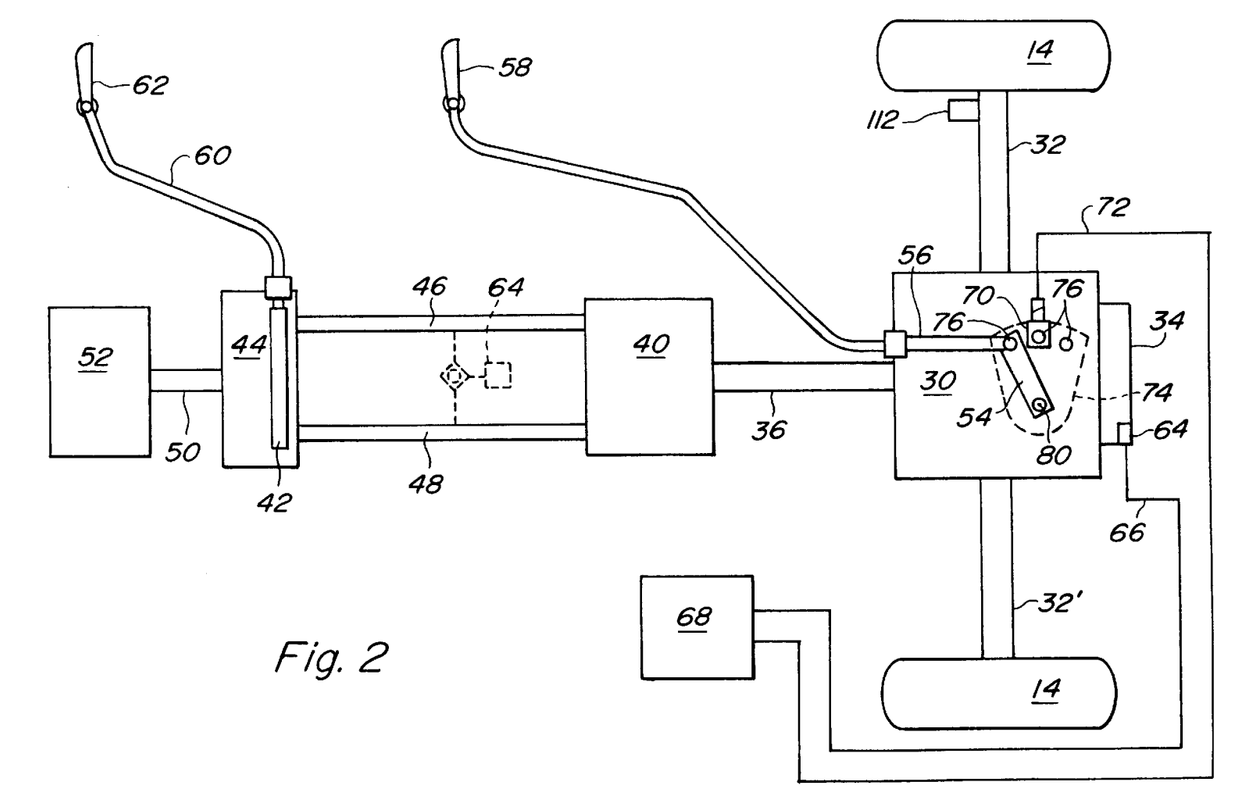
FIG. 2 is a schematic view of a drive system for the harvesting machine.

FIG. 2 shows the drive system of the harvesting machine 10 in a simplified, schematic form. The front wheels 14 are respectively connected through first and second shafts 32 and 32' with the output side of a gearbox 30. It is to be understood that for some vehicles the rear wheels 16 could also be connected to be driven by the gearbox 30. The input side of the gearbox 30 is connected through a third shaft 36 with a hydraulic motor 40. For its part, the hydraulic motor 40 is coupled by two hydraulic oil pressure/return lines 46 and 48 with a hydraulic pump 44, which is connected so as to be driven through a fourth shaft 50 with the main engine 52 of the agricultural vehicle 10. The main engine 52 is arranged to drive the hydraulic pump 44 which supplies the hydraulic motor 40 with pressurized oil over one of the lines 46 or 48 while the other line acts to convey return oil to the pump 44 in a closed system. The hydraulic motor 40 converts the oil pressure into a rotation of the shaft 36, which, for its part, drives the wheels 14 through the gear box 30 and the shafts 32 and 32'. The speed of the shaft 36 is controlled by means of a swash plate 42 of the hydraulic pump 44, which can be controlled over a cable pull 60 and a speed selector lever 62 arranged in the cab 18 for manipulation by the operator of the vehicle. The direction of operation of the vehicle can be reversed by reversing the direction of the flow of the oil in the lines 46 and 48 through appropriate hydraulic valves (not shown) actuated by a corresponding control switch located in the cab 18, or the pump 44 itself could be reversible by having a swash plate which is pivotable to opposite sides of a neutral position. As an alternate construction, the gearbox 30 could be provided with a reverse gear arrangement. The gearbox 30 is provided with three differing gear ratios, that can be selected by means of a shift lever 58 in the cab 18, the shift lever forming one component of a simple and low cost configuration of the shifting arrangement. In this shifting arrangement, the shift lever 58 is connected over a cable pull 56 with another lever 54 which, for its part, is connected so as to drive a positioning plate 74 arranged in the interior of the housing of the gearbox 30. Alternatively, the application of an electro-mechanical or hydraulic device is conceivable that also transmits the motion of the shift lever 58 to the repositioning plate 74.

Figure 4:
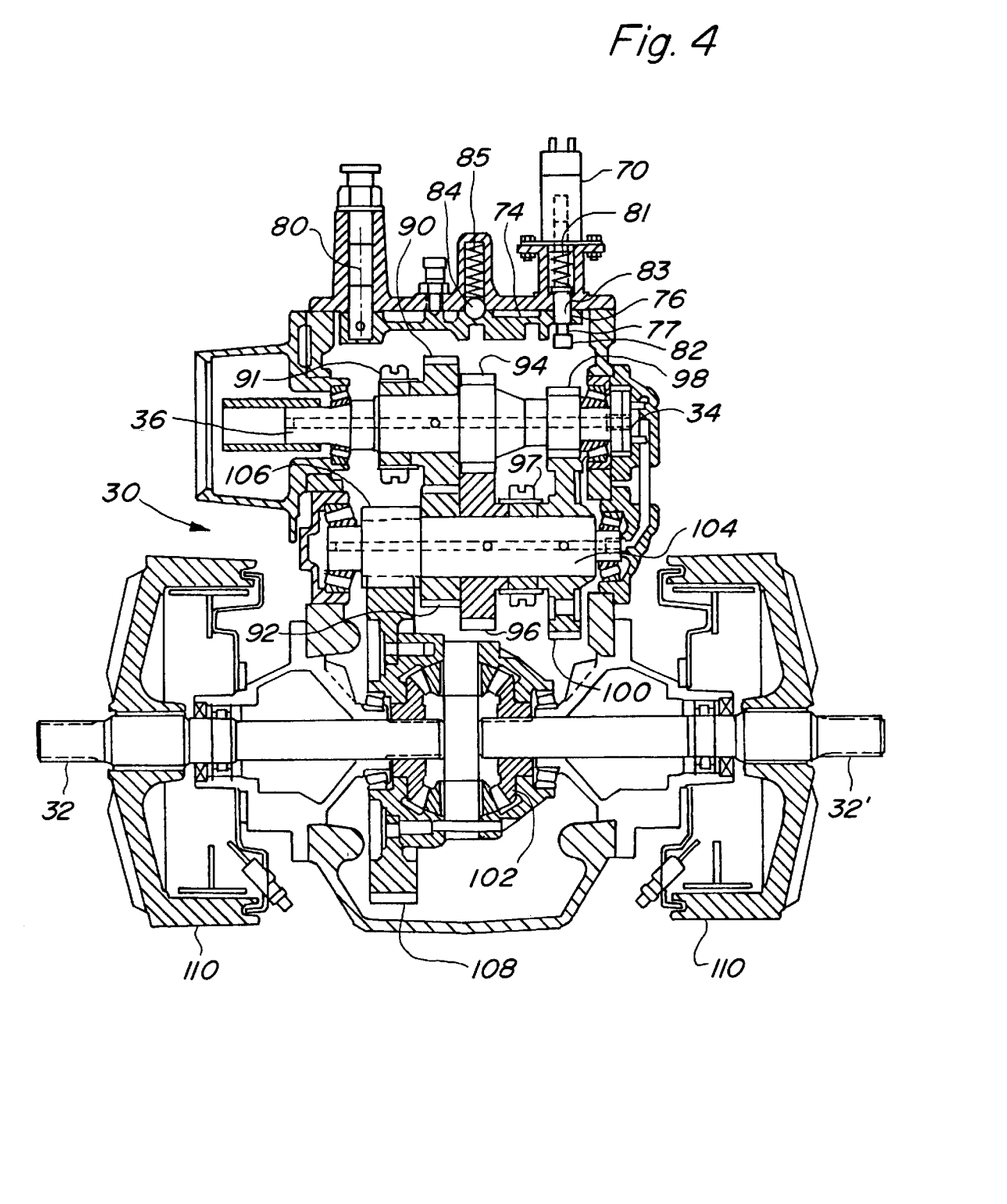
FIG. 4 is a vertical sectional view taken along line 4—4 of FIG. 3.

The positioning plate 74 is employed, in a way known in itself, but is not shown in any further detail in the drawings, to select the gear ratio of the gearbox 30, that is, to select the gears of the gearbox 30 that establish a driving connection between the third shaft 36 on the input side, and the first and second shafts 32 and 32' on the output side. As can be seen in FIG. 4, gears 94 and 98 are rigidly connected to the third shaft 36, and a gear 92 is rigidly fixed to a countershaft 104, while, in a manner described for example in EP 0819562 A, operation of the positioning plate 74 can selectively establish, by means of a sliding coupling device 91 associated with a gear 90 mounted for free rotation about the shaft 36, and by means of a sliding coupling 97 located between and associated with gears 96 and 100 mounted for free rotation about the countershaft 104, which of the three gears 92, 96 and 100 is connected, so as to transmit torque. The countershaft 104, for its part, drives the first and second shafts 32 and 32' through a gear 106, fixed to the counter shaft 104 and meshed with a gear 108 coupled for driving a differential gear set 102, that, in turn, is coupled to the first and second shafts 32 and 32'. During the shifting process, the lever 54 and the positioning plate 74, connected to it so as to drive, is pivoted in the plane of FIG. 2 about a pivot axis 80. The positioning plate 74 can occupy one of three different operating positions in which, in each case, a different gear ratio is selected.

If the positioning plate 74 is in a position between two adjacent operating positions, then the gearbox 30 is in a neutral or idle position, in which there is no driving connection between the shafts 32 and 32' and the third shaft 36. In this case, a forward propulsion cannot be performed by the hydraulic motor 40 nor can it develop any braking action, the latter action being obtainable by placing the swash plate 42 in a position that corresponds to a lower speed than the current vehicle speed. In order to prevent the gearbox 30 from being shifted into the neutral position during operation, ensuring that the braking effect of the hydraulic motor 40 is always available during operation and can be used as a service brake for the vehicle 10, a blocking arrangement is provided which locks the shift arrangement of the gearbox 30 in case the vehicle is not stopped. The blocking arrangement can be arranged to lock the manually operable shift lever 58 and/or the mechanical linkage 54 and 56 through which the shift lever 58 is operationally connected to the positioning plate 74. The last two named solutions are particularly advantageous since in the cab 18, in which the shift lever 58 is arranged, frequently little space is available while in the vicinity of the gearbox 30 as a rule adequate space is available and the blocking arrangement can be attached without any problems to repositioning arrangements already present on the gear-box 30. A further conceivable blocking arrangement would be to connect the shift lever 58 mechanically to a further device, independent of the repositioning unit or repositioning plate 74 of the gearbox, which can be locked by the by the blocking arrangement. This latter type of blocking arrangement has the advantage that it can be applied at any desired location of the vehicle. In the case where an electro-mechanical or hydraulic device is used between the shift lever 58 and the positioning plate 74, it in appropriate to permit the blocking arrangement to interact with the shift lever in order to mechanically indicate to the user that no shifting is possible when the vehicle is moving.

Figure 3:
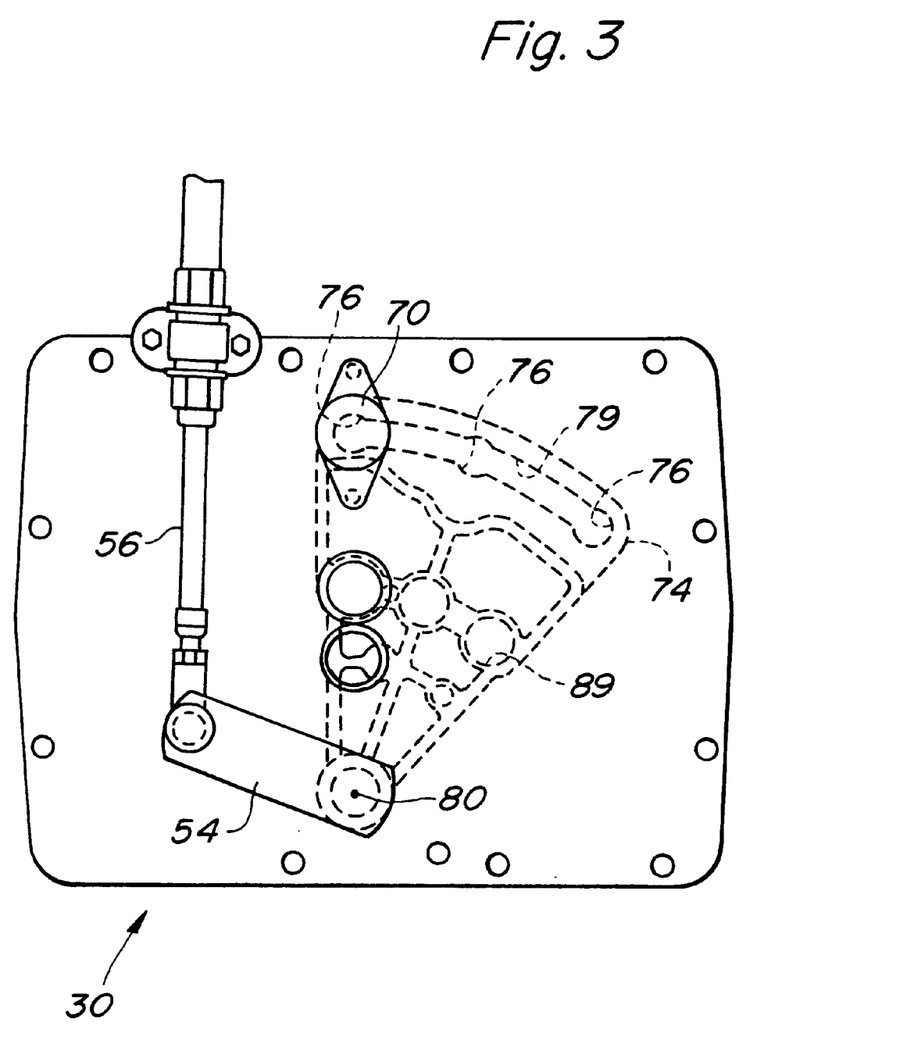
FIG. 3 is a plan view of the cove plate of the gear box of the harvesting machine.

The blocking arrangement of the preferred embodiment is of the type for locking the repositioning plate 74 and includes an electronic control arrangement 68, that is connected through a line 66 with a sensor 64, which may be a pressure responsive switch. The sensor 64 is attached to a lubricating oil pump 34 of the gearbox 30, and detects the oil pressure that is made available by the lubricating oil pump 34. The lubricating oil pump 34 is known in itself and is connected so as to be driven by one of the shaft 36, when the latter is driven by the motor 40, or by the shafts 32 or 32', when the vehicle is coasting. In any event, the lubricating pump 34 is used to supply oil for lubricating the gearbox 30. Alternatively, the sensor 64 could be placed, as shown in dashed lines in FIG. 2, for sensing the pressure of the oil being delivered by the pump 44 to the motor 40, or by the motor 40 to the pump 44. Therefore, the lubricating oil pump 34 is operable to generate oil pressure anytime the front wheels 14 are rotating, and the presence of pressure in one or the other of the lines 46 and 48 indicates that the wheels 14 are either being driven by the motor 40 or that the vehicle 10 is coasting with the motor 40 being driven as a pump by the rotating wheels 14. In either case, if the sensor 64 determines that the vehicle is moving, the pressure switch closes and completes a circuit through the control arrangement 68 so as to send electric current through a line 72 coupled to a solenoid of a locking element 70, which operates to extend a pin 82, against the force of a return spring 81 (see FIG. 4) so that a shoulder portion 83 is received in a selected one of three complementary shaped openings 76 of the positioning plate 74 located at a fixed radius about the shaft 80 (see FIG. 3) and connected together by a narrow guide path 79. The shoulder portion 83 of the pin 82 blocks the positioning plate 74 mechanically and prevents the shift lever 58 from being moved. Thereby the gearbox 30 cannot be brought into the neutral position. If, on the other hand, the sensor 64 determines that the vehicle is stopped, the sensor 64 acts to effect an open switch so that an open circuit is established resulting in the blocking control arrangement 68 discontinuing current flow to the locking element 70 so that its solenoid is deactivated permitting the return spring 81 to retract the shoulder portion 83 from the opening 76 and bring a neck portion 77 of the pin 82 into register with the guide slot 79. The operation of the shift lever 58 and a movement of the positioning plate 74 into a different operating position can now be accomplished without any problem. Once the vehicle 10 begins to move, the blocking control 68 will again be energized through operation of the sensor 64 so that the locking element 70 is energized to cause the pin 82 to once again be extended into the opening 76 that is associated with the newly selected speed ratio. The positioning plate 74 is retained in each of its operating positions by means of a detent arrangement comprising a ball 84 releasably loaded, by a spring 85, into a respective one of three hemispherical detent seats or recesses 89 respectively located in the positioning plate 74 so as to register with the ball 84 when the plate 74 is positioned for selecting a desired gear ratio.

FIG. 4 shows a vertical section through the gearbox 30 and here it can be seen that the third shaft 36 (FIG. 4) is rotated through 90° as compared to FIG. 2 (where it was shown in offset position for the sake of simplicity). In addition, brakes 110 associated with the shafts 32 and 32' can be seen, which make available an additional braking effect to that of the hydraulic motor 40.

Figure 5:
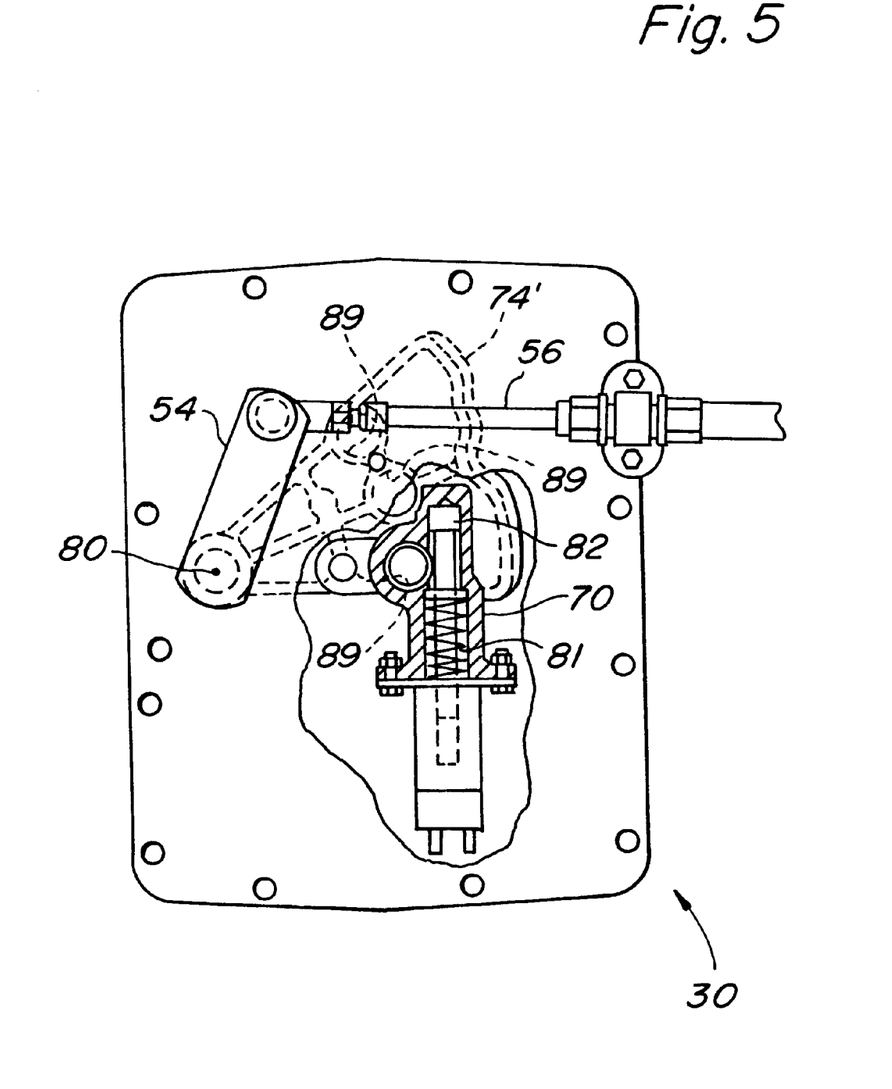
FIG. 5 is a plan view of a cover plate of the gearbox according to a second embodiment.
Figure 6:
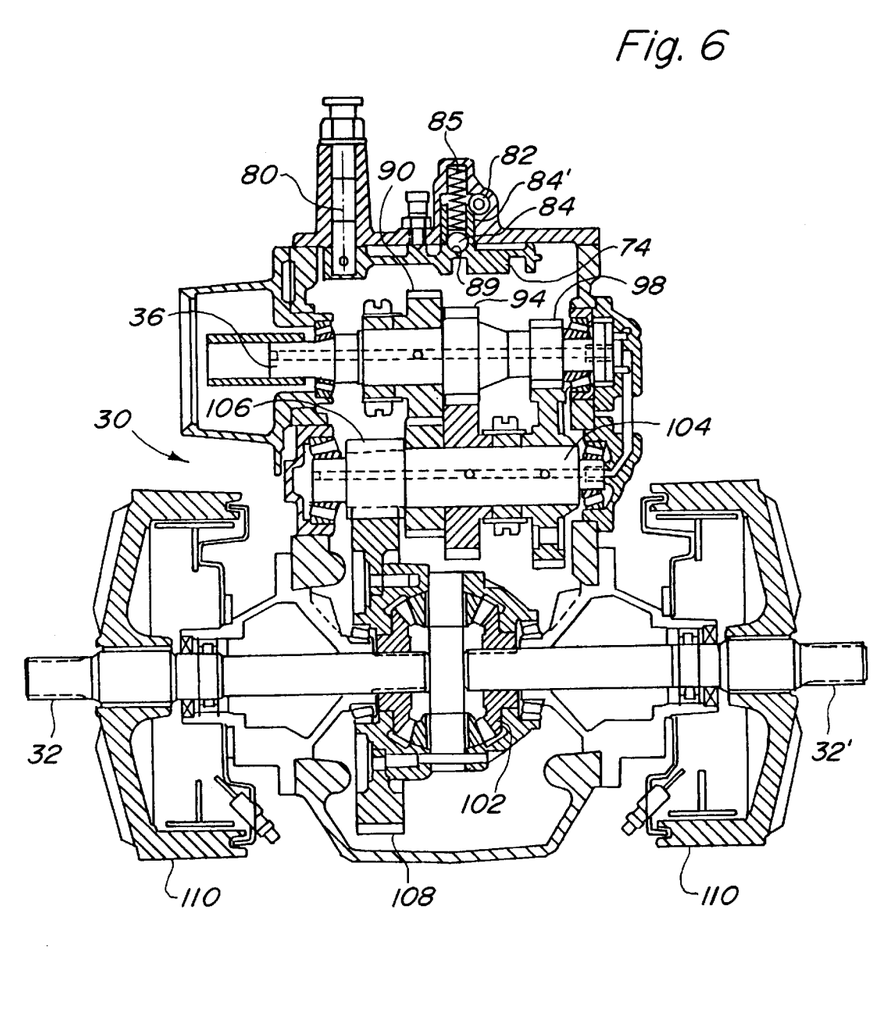
FIG. 6 is a vertical section view taken along line 6—6 of FIG. 5.

FIGS. 5 and 6 show a gearbox 30 according to a second embodiment of the invention. Parts that correspond to the parts shown in FIGS. 2 through 4 are designated by the same reference numerals. Most of these parts are identical so that for these parts a more detailed description is omitted. In the second embodiment of the invention, a positioning plate 74' is provided that, like the plate 74 described above, is supported in bearings so as to pivot about the pivot axis 80. Also like the plate 74, the plate 74' is provided with a detent arrangement comprising the three hemispherical detent element seats or recesses 89 located at equal distances from the pivot axis 80 for selective engagement by the detent ball 84. While shifting the positioning plate 74' rotates it about the pivot axis 80 and forces the ball 84 upward (as seen in FIG. 6) against a detent element 84' that is biased toward the ball 84 by the force of the spring 85. A detent is therefore provided for selectively retaining the positioning plate 74 in three rotational positions, each of which corresponds to an operating position with a specific gear ratio of the gearbox 30. In the second embodiment of the invention, the locking element 70 is arranged to block the movement of the ball 84 from a selected one of the seats 89, so that a pivoting of the positioning plate 74' about the pivot axis 80 is prevented. Thus, the positioning plate 74' differs from the plate 74 in that it does not have an arcuate slot for the reception of the locking pin 82. Specifically, the locking element 70 is arranged such that the blocking pin 82 is located in a bore that registers with the top of the detent element 84' when the detent ball 84 is received in the seat 89. Actuation of the locking element 70 results in the pin 82 being projected above the detent element 84' so as to capture the ball 84 and prevent movement of the positioning plate 74'. If the locking element 70 is not activated, the element 84' and therewith the ball 84 can move freely so that a shifting process is possible. A significant difference as compared with the embodiment shown in FIGS. 3 through 5 lies in the fact that the locking element 70, that is also equipped with an electromagnet, is oriented parallel to the positioning plate 74' and to the upper side of the gearbox 30. Therefore the second embodiment requires less space and can be applied more easily to vehicles already in mass production or even to existing agricultural vehicles.

It should be noted that in place of an electromagnetically actuated locking element 70, a hydraulically actuated locking element could be employed. Also, other sensors in place of the sensor 64 could be used for the detection of the movement of the vehicle, such as, for example, a speed sensor 112 (FIG. 2) interacting with one of the wheels 14 or even a non-contacting sensor, for example an optical sensor 114, shown schematically in FIG. 1, could be used to sense relative movement between the ground and the vehicle 10. In either case, the sensor 112 or the sensor 114 operates to send a signal to the blocking control arrangement 68 when the vehicle 10 is moving relative to the ground.

What is claimed is:

1. In a drive system for an agricultural vehicle provided with rotatable propulsion elements in contact with the ground, a gear transmission coupled for driving said propulsion elements and including shiftable control elements for selectively establishing a neutral condition in said gear transmission, a shifting arrangement coupled for selectively shifting said control elements, and a hydrostatic transmission including a hydraulic motor coupled for establishing a drive input in said gear transmission and capable of acting as a brake for said propulsion elements, the improvement comprising: said shift arrangement including selectively movable blocking device for locking the shifting arrangement for preventing it from being moved for establishing said neutral condition until the agricultural vehicle is stopped.

2. The drive system according to claim 1 wherein, once said blocking device acts to lock said shifting arrangement, it acts to release said shifting arrangement in response to said vehicle coming to a standstill.

3. The drive system according to claim 1 wherein said shifting arrangement includes a shift lever manually movable among various shift positions by an operator; said control elements including a pivotally mounted positioning plate coupled to said shift lever for being pivoted thereby; and said blocking device including a locking element mounted for movement between a blocking position locking said positioning plate in a selected position corresponding to a desired speed ratio, and a release position permitting said positioning plate to be pivoted from said selected position to a new position corresponding to a second desired speed ratio.

4. The drive system according to claim 3 wherein said locking element forms part of a solenoid coupled in an electrical circuit including a pressure switch forming part of a motion sensor which acts to complete the electrical circuit through said solenoid only when said vehicle is in motion.

5. The drive system according to claim 4 wherein said gear transmission includes an input shaft coupled to a lubrication pump; and said pressure switch being coupled to said lubrication pump so as to sense oil pressure developed by said pump when the latter is driven.

6. The drive system according to claim 4 wherein said positioning plate is mounted for pivoting about a fixed axis; an arcuate slot being formed in said positioning plate at a fixed radius about said axis, with said slot being of a fixed width except in at least a pair of locations, corresponding to a pair of different gear ratios of said transmission, where the slot respectively includes a pair of enlarged circular areas; and said locking element being in the form of a pin having a shoulder sized to fit in said arcuate slot only at said circular areas and joined to a pin section sized to permit its movement along an entire length of said slot; a spring normally biasing said pin to a non-blocking position wherein said pin section is located in said slot; and said solenoid, when energized, shifting said pin to a blocking position wherein said shoulder is located in a selected one of said at least enlarged two circular areas.

7. The drive system according to claim 4 wherein said positioning plate is mounted for pivoting adjacent a wall of said gear transmission; a detent arrangement associated with said positioning plate for releasably retaining the latter in selected positions for effecting desired gear ratio changes in said gear transmission; said detent arrangement including a detent seat provided in said positioning plate at respective locations corresponding to said selected positions, a detent element arrangement including a portion located in said seat, and a spring compressed between said detent element arrangement and said wall; and said locking element being in the form of a pin mounted for movement to and from blocking engagement with said detent element arrangement so as to selectively prevent said ball from moving from said seat, to thereby prevent movement of said positioning plate.

8. The drive system according to claim 1 wherein said blocking device includes a sensor that senses when the vehicle is moving relative to the ground and has a locking element that operates in response to the sensor to effect locking of said shifting arrangement when the sensor is sensing vehicle movement.

9. The drive system according to claim 8 wherein said gear transmission includes a lubricating pump coupled for being driven anytime said vehicle is in motion; and said sensor being an oil pressure sensor coupled for sensing the pressure of oil delivered by said lubricating pump.

10. The drive system according to claim 8 wherein said hydrostatic transmission includes a pair of pressure/return lines coupled to said motor; and said sensor being an oil pressure sensor coupled for sensing the pressure of oil present in said pair of pressure/return lines and thus being operable for sensing when the motor is pressurized for driving said propulsion elements through said gear transmission or when said propulsion elements are coasting so as to drive said motor through said gear transmission.

* * * * *